US009113400B2

(12) United States Patent
Varma

(10) Patent No.: US 9,113,400 B2
(45) Date of Patent: Aug. 18, 2015

(54) METHOD AND APPARATUS FOR OFFLOADING PACKET TRAFFIC FROM LTE NETWORK TO WLAN USING DPI

(71) Applicant: Tellabs Operations, Inc., Naperville, IL (US)

(72) Inventor: Subir Varma, San Jose, CA (US)

(73) Assignee: Tellabs Operations, Inc, Naperville, IL (US)

( * ) Notice: Subject to any disclaimer, the term of this patent is extended or adjusted under 35 U.S.C. 154(b) by 118 days.

(21) Appl. No.: 13/791,271

(22) Filed: Mar. 8, 2013

(65) Prior Publication Data

US 2014/0254576 A1    Sep. 11, 2014

(51) Int. Cl.
*H04W 48/16*    (2009.01)
(52) U.S. Cl.
CPC .................................... *H04W 48/16* (2013.01)
(58) Field of Classification Search
CPC ..................................................... H04W 48/16
USPC ................................. 370/338, 328, 329, 465
See application file for complete search history.

(56) References Cited

U.S. PATENT DOCUMENTS

| 2012/0008551 | A1* | 1/2012 | Giaretta et al. | 370/328 |
| 2012/0324100 | A1* | 12/2012 | Tomici et al. | 709/224 |
| 2013/0138823 | A1* | 5/2013 | Centemeri et al. | 709/228 |
| 2013/0163463 | A1* | 6/2013 | Grayson et al. | 370/253 |
| 2013/0322347 | A1* | 12/2013 | Alex et al. | 370/329 |

* cited by examiner

*Primary Examiner* — Brian D Nguyen
(74) *Attorney, Agent, or Firm* — James M. Wu; JW Law Group

(57) ABSTRACT

A mobile network configuration is able to offload packet flows based on identification ("ID") rules to a wireless network using a deep packet inspection ("DPI") function. After activating DPI function located in a packet data network gateway ("PDN-GW"), every packet flow passing through the PDN-GW is monitored, detected, and analyzed based on a set of predefined ID rules. Upon identifying a packet flow for a predefined network application, the packet flow is offloaded from a long term evolution ("LTE") network to a wireless local area network ("WLAN") or Wi-Fi network. To reduce traffic loading on the LTE network, the PDN-GW sends binding updates containing offloading information associated with the packet flow to user equipment ("UE") for offloading implementation.

19 Claims, 5 Drawing Sheets

METHOD AND APPARATUS FOR OFFLOADING PACKET TRAFFIC FROM LTE NETWORK TO WLAN USING DPI

FIELD

The exemplary embodiment(s) of the present invention relates to communications network. More specifically, the exemplary embodiment(s) of the present invention relates to traffic offload from a cellular network to a wireless network.

BACKGROUND

With rapid growth of mobile data transfer over a high-speed communication network such as 3G or 4G cellular services, managing and routing such data transfer efficiently become increasingly difficult. A conventional network layout, for example, typically includes various networks, such as Internet, local area network ("LAN"), wireless local area network ("WLAN"), and cellular radio network. A conventional mobile or wireless network may include $3^{rd}$ Generation Universal Mobile Telecommunications System ("3G UMTS"), long term evolution ("LTE"), 3rd Generation Partnership Project 2 ("3GPP2") and/or Worldwide Interoperability for Microwave Access ("WiMAX"). A typical network layout includes hundreds of network devices such as access switches, routers, and bridges used for data delivery from source devices to destination devices.

A drawback associated with a typical user equipment "UE" or user device is that it is often difficult to determine which packet flow(s) can be offloaded to WLAN while other packet flow(s) continues to go through the cellular network. To reduce traffic load on a cellular network, network operator often prefers to shift traffic loading to WLAN whenever it is possible when UE is able to access to both cellular network and WLAN.

A conventional approach to improve UE's ability to decide which traffic should be offloaded to Wi-Fi is to use Access Network Discovery and Selection Function ("ANDSF"). However, a problem associated with ANDSF is that it requires substantial computing power which often is not available in a UE. Another problem associated with ANDSF operated at the UE end is that ports or addresses may dynamically change over time for various reasons such as network securities or detection avoidance.

SUMMARY

A mobile network configuration capable of offloading packet flows based on identification ("ID") rules to a wireless network using a deep packet inspection ("DPI") function is disclosed. After activating DPI function located in a packet data network gateway ("PDN-GW"), every packet flow passing through the PDN-GW is monitored, detected, and analyzed based on a set of predefined ID rules. Upon identifying a packet flow for a predefined network application, the packet flow is offloaded from a long term evolution ("LTE") network to a wireless local area network ("WLAN") or Wi-Fi network. To reduce traffic loading on the LTE network, the PDN-GW sends binding updates containing offloading information associated with the packet flow to user equipment ("UE") for offloading implementation.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
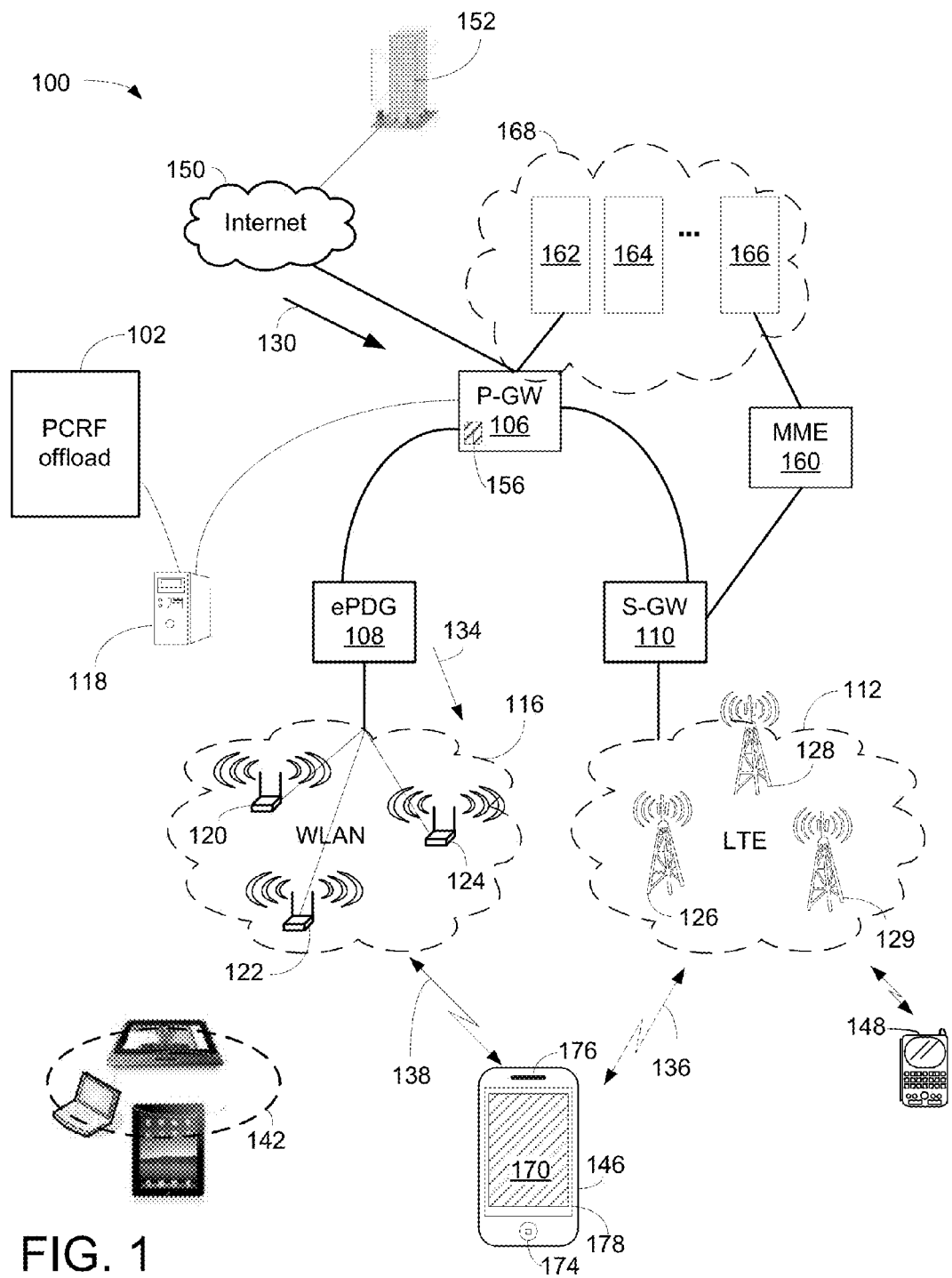
FIG. 1 is a block diagram illustrating a network configuration having one or more network devices configured to offload packet flows from a cellular network to WLAN in accordance with one embodiment of the present invention.

Exemplary embodiment(s) of the present invention is described herein in the context of a method, device, and apparatus of employing deep packet inspection ("DPI") to identify packet flows based on a set of identification rules for WLAN traffic offload.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Information pertaining to the transfer of packet(s) through a network is embedded within the packet itself. Each packet traveling through one or more communications networks such as Internet and/or Ethernet can be handled independently from other packets in a packet stream or traffic. For example, each router, which may include routing, switching, and/or bridging engines, processes incoming packets and determines where the packet(s) should be forwarded.

One embodiment of the present invention discloses a mobile network configuration capable of offloading packet flows based on identification ("ID") rules to a wireless network using a deep packet inspection ("DPI") function. After activating DPI function located in a packet data network gateway ("PDN-GW"), every packet flow passing through the PDN-GW is monitored, detected, and analyzed based on a set of predefined ID rules. Upon identifying a packet flow for a predefined network application, the packet flow is offloaded from a long term evolution ("LTE") network to a wireless local area network ("WLAN") or Wi-Fi network. To reduce traffic load on the LTE network, the PDN-GW sends binding updates containing offloading information associated with the packet flow to user equipment ("UE") for offloading implementation.

FIG. 1 is a block diagram 100 illustrating a network configuration having one or more network devices configured to offload packet flows from a cellular network to WLAN in accordance with one embodiment of the present invention. Diagram 100 includes a PDN-GW or P-GW 106, mobility management entity ("MME") 160, serving gateway ("S-GW") 110, evolved packet data gateway ("ePDG") 108, and Internet 150. ePDG 108 may also be referred to as enhanced packet data gateway which is used to interface or communicate with non-trusted 3GPP IP systems. Diagram 100 further includes a WLAN 116 and LTE 112 configured to be accessible by various smart phones or tablets such device 146, 148, and 142. The network configuration illustrated by diagram 100 can be and/or includes an evolved packet core ("EPC") network. It should be noted that the underlying concept of the exemplary embodiment(s) of the present invention would not change if one or more blocks (or devices) were added to or removed from diagram 100.

P-GW 106, which is also known as Home Agent, is coupled to S-GW 110, ePDG 108, and Internet 150, and provides network communication between a UE such as UE 146 and content provider 152 via multiple networks such as Internet 150. Functions of P-GW 106 include, but not limited to, device connectivity, packet filtering, inspection, data usage, billing, or PCRF (policy and charging rules function) enforcement, et cetera. P-GW 106 also provides an anchoring function for mobility between 3G and 4G (or LTE) packet core network(s). P-GW 106, in one aspect, includes component 168 containing multiple modules, such as billing module 162, subscribing module 164, tracking module 166, and the like, for routing activities between source(s) and destination(s). In one embodiment, P-GW 106 includes a DPI 156 used to identify off-loadable packet flows passing through P-GW 106.

DPI 156 is a digital processing module which can be hardware, software, firmware, or a combination of hardware, software and firmware. In one embodiment, DPI 156 is configured to provide and implement DPI assisted WLAN traffic offloading ("DWO"). After inspecting packet flow passing through P-GW 106, DPI 156 is able to identify and characterize off-loadable packet flow based on a set of predefined ID rules. For instance, the ID rules for offloading may be stored in PCRF 102 in a server 118 which is coupled to DPI 156 via P-GW 106. It should be noted that server 118, PCRF 102, and P-GW 106 may be integrated into a single device.

In a packet switching network, a packet flow, which can also be referred to as packet stream, traffic flow, packet flow, flow, data stream, and/or network flow, includes multiple packets having heads and payloads configured to carry certain types of information such as data, voice, or video capable of traveling from a source node to a destination node. In one example, a packet flow refers to a packet or a sequence of packets.

S-GW 110, in one example, is coupled to MME 160 and cellular network or LTE 112. S-GW 110 is configured to transfer data packets or packet flows between cell site (or eNodeB), MME 160, and P-GW 106. Note that S-GW 110 may couple to other network elements such as additional MMEs and/or base stations. S-GW 110 can also be configured to perform network management functions, such as terminating paths, paging idling UEs, storing data, routing information, generating replica, and the like.

LTE 112 is a cellular communications network using wireless or cellular information technology such as GSM and/or UMTS protocols/standards. LTE 112, which may also directly couple to MME 160, includes cell sites (not shown in FIG. 1) and radio towers 126-129. The cell site is also known as base station, node B, and/or eNodeB. Radio tower 126, for example, is coupled to one or more UEs, such as a cellular phone or handheld device 146-148, tablets and/or iPad® 142 via wireless connections. Handheld device 146 can be a smart phone, such as iPhone®, BlackBerry®, Android®, and so on. A function of LTE 112 is to facilitate network communication between mobile devices. It should be noted LTE 112 may include additional radio towers as well as other land switching circuitry.

ePDG 108, which can also be referred to as enhanced packet data gateway, is configured to handle interface between an untrusted non-3rd Generation Partnership Project ("3GPP") network and the EPC network using established secure channel(s). An untrusted non-3GPP network can be a wireless communications network such as Wi-Fi hot spot. ePDG 108 uses a secure communication protocol to route data or information between UEs coupled to the untrusted non-3GPP network. For example, ePDG 108 is able to establish an Internet Protocol Security ("IPSec") connection 134 for transporting data to and from a trusted and/or an untrusted non-3GPP wireless network.

WLAN 116, in one embodiment, includes multiple wireless access points ("WAPs") 120-124 and is connected to ePDG 108 and UE 146. For instance, when WLAN is established based on IEEE 802.11 standards, it provides a local coverage area with various WAPs permitting a UE to access one of the nearest WAPs 120-124 for connecting to the Internet. It should be noted that when a UE is capable of operating under both LTE 112 and WLAN 116, some traffic is received via LTE 112 cellular connection while others may be received via WLAN 116 via DWO.

UEs 142-148 are mobile devices capable of communicating with P-GW 106 either via LTE 112 or WLAN 116. UEs 142-148 can be tablets, smart phones, cellular phones, laptops, navigation systems, watches, and the like. While tablets may be iPad® or Samsung Galaxy® 122, smart phones can be iPhone®, BlackBerry®, Android®, and so on. Mobile device 146, in one example, includes a screen 178, button 174, and speaker 176, wherein screen 178 displays a mobile application 170. Mobile device 146 can be a portable wireless UE, such as a smart phone, laptop, tablet, and the like, and is connected to a cellular radio network such as radio tower 126 for communicating with P-GW 106. Alternatively, mobile device 146 can also be connected to WLAN via WAP 122 for communicating with P-GW 106.

To reduce traffic congestion across the cellular network such as LTE 112, DWO is used to offload packet flows from the cellular network to a WLAN based on a set of predefined ID rules. For example, DPI engine at P-GW 106 monitors and inspect every packet or packet flow traveling through P-GW 106 in accordance with a set of rules. In one aspect, the set of rules, which may be stored at PCRF 102, includes IP header 5-tuple, uniform resource locator ("URL') address, application(s), and/or traffic type. Upon identifying and characterizing off-loadable packet flows in response to ID rules, DPI 156 communicates information relating to off-loadable packet flows to the UE using existing protocols elements. The 5-tuple of header, in one example, refers to information in the fields of source IP address, destination IP address, source port number, destination port number, and IP protocol type.

An advantage of using DWO is that it uses existing protocol elements to implement WLAN traffic offloading as oppose to using ANDSF which requires sophisticated hardware resource. Another advantage of using DWO is that it uses capabilities of DPI to identify packet flows for offloading as oppose to use UE to identify the off-loadable flow.

Figure 2:
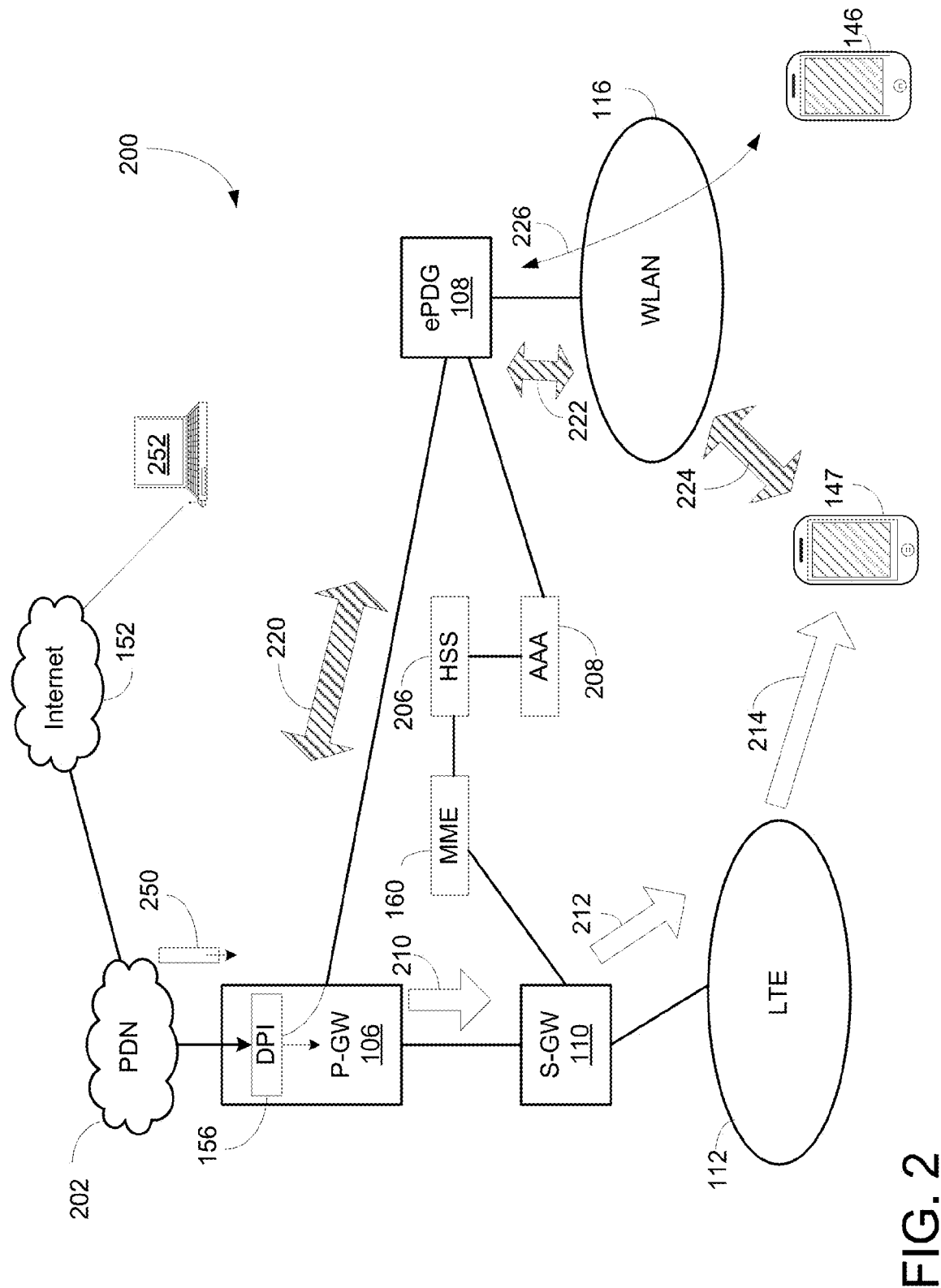
FIG. 2 is a block diagram illustrating an alternative network layout using DPI to provide DWO in accordance with one embodiment of the present invention.

FIG. 2 is a block diagram 200 illustrating an alternative network layout using DPI to provide DWO in accordance with one embodiment of the present invention. Diagram 200 includes a packet data network ("PDN") 202, P-GW 106, ePDG 108, S-GW 110, and UEs 146-147. UEs 146-147, in one aspect, are connected to Internet 152 through either WLAN 116 or LTE 112. It should be noted that ePDG 108 can be coupled with S-GW 110 via several intervening network elements such as MME 160, HSS 206, and AAA 208. It should be noted that the underlying concept of the exemplary embodiment(s) of the present invention would not change if one or more blocks (or devices) were added to or removed from diagram 200.

PDN 202, in one example, is a packet switching communications network that uses packets to transfer information between a source and a destination. Multiple packets may be independently transmitted to their destination and the sequence of packets can be reassembled or reordered to its original order of packets when they reach to their destination. HSS 206 is a database containing subscriptions and authentication information. HSS 206 is able to manage and verify user subscription based on stored information. Upon authenticating user's identity, a session(s) in accordance with user's subscription is established. AAA 208, on the other hand, refers to network authentication, authorization, and accounting in connection to a user or UE. While authentication verifies the identity of UE, authorization grants accessibility of the network such as WLAN to the UE. The accounting records the usage of the network by the UE.

The network layout illustrated in diagram 200 includes ePDG 108, S-GW 110, PDN-GW or P-GW 106 and are configured to implement DWO. In one embodiment, ePDG 108 provides network service between UEs 146-147 and WLAN 116. In one example, ePDG 108 communicates with at least one of UEs 146-147 via an untrusted non-3GPP using IPSec. S-GW 110 is used to provide network service between UEs 146-147 via LTE network 116. PDN-GW 106 having a DPI agent is coupled to S-GW 110 and ePDG 108.

The DPI agent, in one embodiment, identifies packet flows traveling through P-GW 106 and is capable of offloading a portion of packet flows from LTE network 112 to WLAN 116 based on a set of predefined offload rules. For example, the DPI agent exams each packet flow passing through PDN-GW 106 and generates binding updates based on packet flow's IP header 5-tuple, URL address, application, and traffic type. Note that LTE 112 further includes one or more cell sites coupled to S-GW 110 and communicates with at least one of UEs via LTE network 116. In one embodiment, UE 147 sends a packet flow to WLAN 116 based on binding updates received from PDN-GW 106.

In operation, upon activating DWO, DPI 156, in one embodiment, monitors all traffic or packet flows traveling through PDN-GW 106 according to a set of predefined ID rules for WLAN offloading. After analyzing and characterizing packet flow 250, DPI 156 determines that packet flow 250 is off-loadable to WLAN. After generating message(s) indicating new binding updates such as new care-of address and mobile node address, the binding updates, predefined offloading rules, and packet flow 250 are forwarded to S-GW 110 as indicated by arrow 210. When UE 147 receives the binding updates, offloading rules and packet flow 250 via LTE 112 as indicated by arrows 212-214, it stores and/or installs binding updates and offloading rules. UE 147 subsequently releases at least a portion of bandwidth of LTE 112 and begins to offload data stream associated with packet flow 250 to WLAN 116 as indicated by arrows 220-224. For example, if an application is Skype® between UE 147 and laptop 252, the packet flow or flows carrying video and voice information for Skype® application can be offloaded to WLAN 116 after initial communications via LTE 112.

An advantage of using DWO is that DIP at P-GW can identify applications that use dynamic port numbers. Another advantage of using the embodiment of present invention is that DIP at P-GW is able to identify applications using Port 80 which is used to penetrate firewalls.

Figure 3:
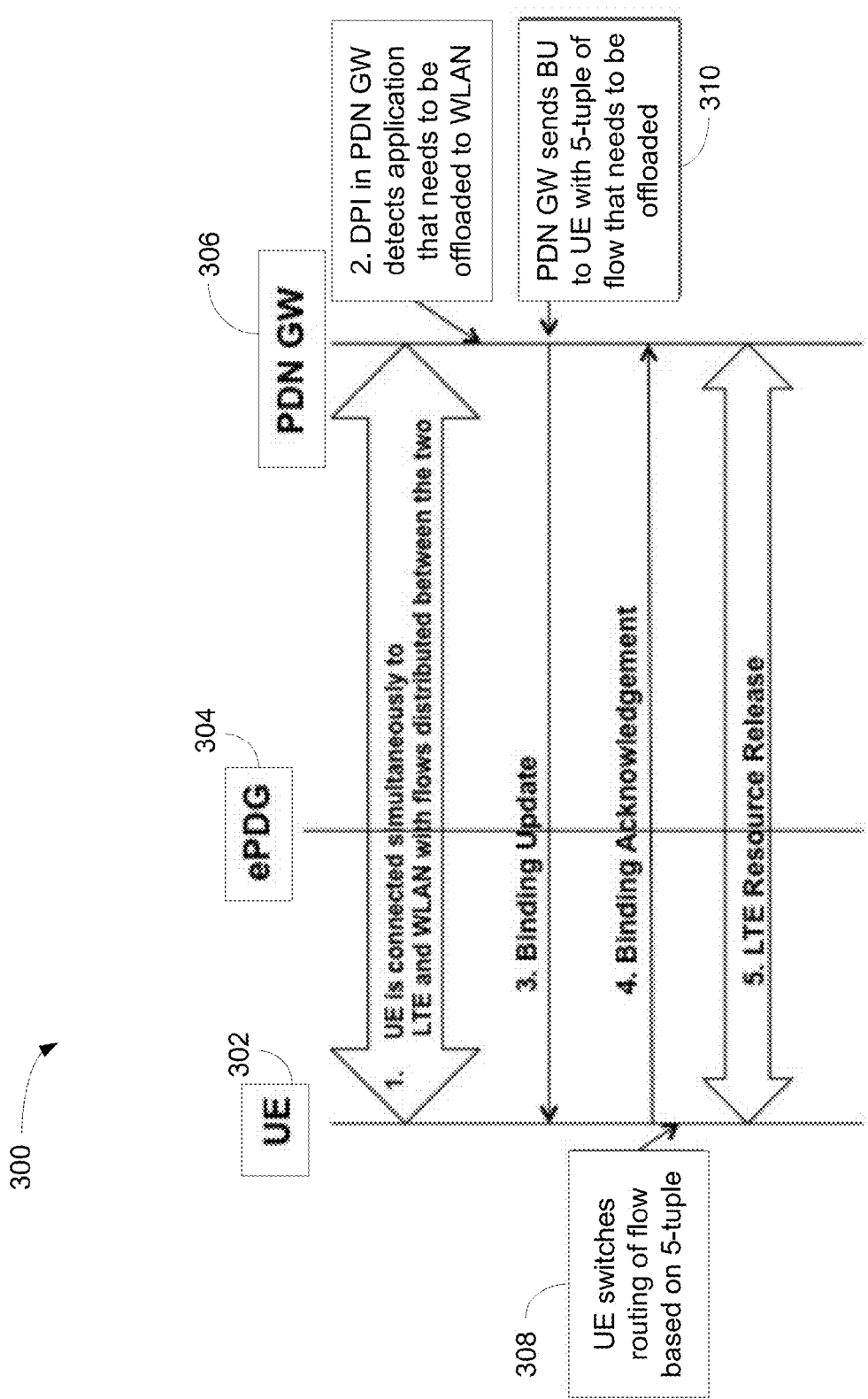
FIG. 3 is a logic diagram illustrating a process of DWO able to offload identified packet flow to WLAN in accordance with one embodiment of the present invention.

FIG. 3 is a logic diagram 300 illustrating a process of DWO able to offload identified packet flow to WLAN in accordance with one embodiment of the present invention. Diagram 300 includes PDN-GW 306, ePDG 304, and UE 302. In one exemplary operation, system operator publishes policies and/or ID rules that specify whether a UE such as UE 302 should offload specific flows to WLAN, or keep it on LTE network. Such policies or ID rules are obtained by PDN-GW 306 using interface to a policy server such as PCRF. The following table illustrates several examples of flow identification rules:

TABLE

Identify flows by IP header 5-tuple
Identify flows by URL address
Identify flows by application (e.g. P2P, youtube, Skype etc)
Identify flows by traffic type (e.g. video)

During an operation, in step 1 of diagram 300, the network system enables UE 302 to split up flows to a single PDN across multiple physical interfaces using IP Flow Mobility ("IFOM") capabilities. In one example, UE 302 is in an area that has both LTE and WLAN coverage and consequently, some of the flows are routed through LTE, while others are routed through WLAN using IFOM.

At step 2, the DPI engine in PDN-GW 306 continuously analyzes the traffic flowing through the gateway, and if DPI engine detects any of the applications that can be offloaded to the WLAN, the DPI engine saves the 5-tuple that characterizes the packet flow from that application. It should be noted that the 5-tuple generally cannot be determined in advance due to the reasons such as dynamic port numbering and flow re-directions.

At step 3, PDN-GW 306 sends a binding update to UE 302 wherein the updates include the 5-tuple flow identifier and the routing rule as indicated by numeral 310 that should be used by UE 302 for offloading implementation.

At steps 4, UE 302 installs the new routing rules and switches the routing of flows to the WLAN interface based on the binding update as indicated by numeral 308. In one embodiment, UE 302 also sends a binding acknowledgement ("Ack") back to PDN-GW 306.

At step 5, in the event that the flow rerouting causes all traffic to cease on a particular interface, UE 302 takes down the PDN connection on that interface.

An advantage of using embodiment of the present invention is that DIP at PDN-GW implementing DWO can identify server IP addresses which can change due to the presence of CDN ("Content Delivery Network") based flow redirection.

Figure 4:
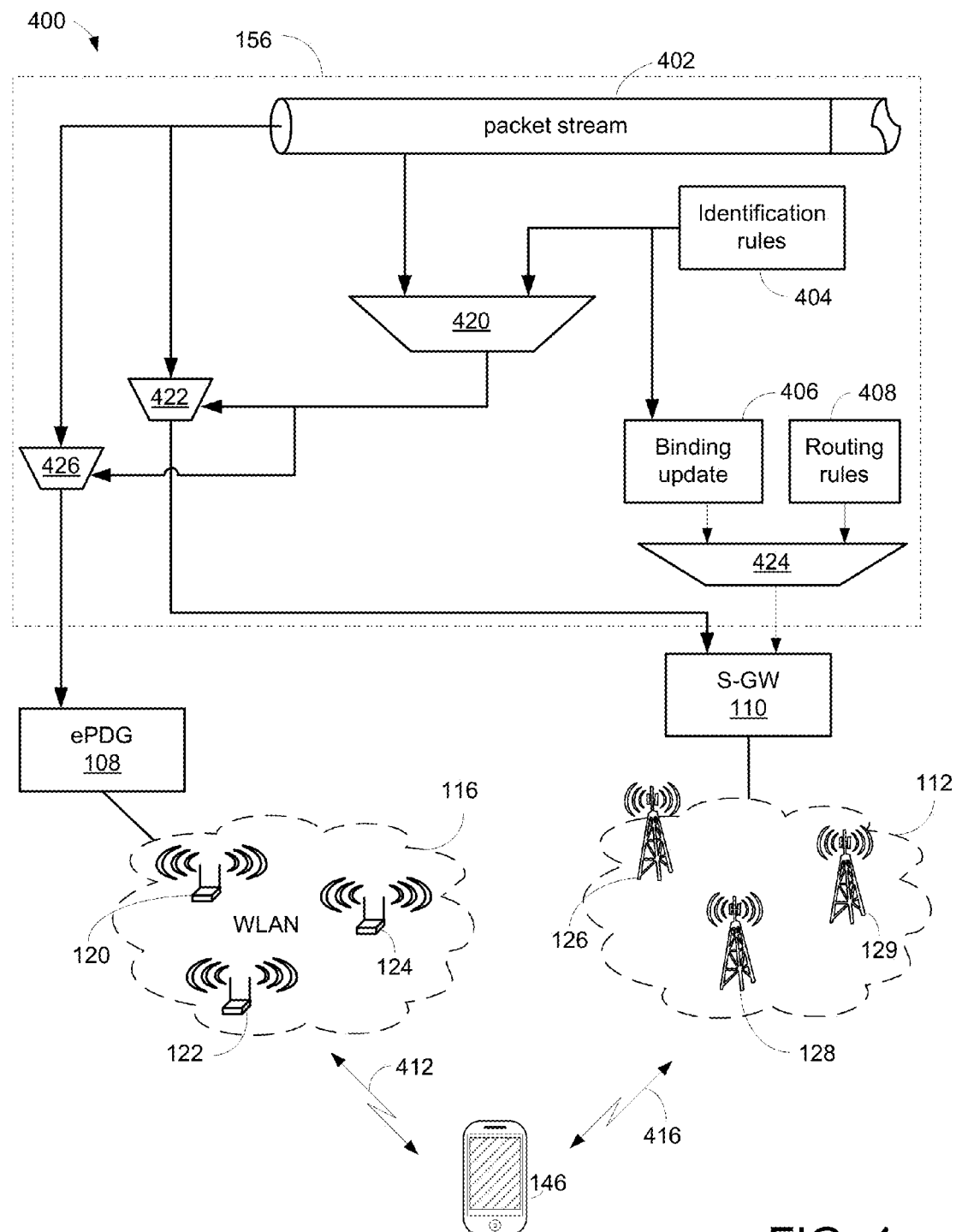
FIG. 4 is a logic flow diagram illustrating an exemplary process of DPI to identify packet flow based in ID rules for offloading in accordance with one embodiment of the present invention.

FIG. 4 is a logic flow diagram 400 illustrating an exemplary process of DPI to identify packet flow based in ID rules for offloading in accordance with one embodiment of the present invention. Diagram 400 includes DPI 156, ePDG 108, S-GW 110, LTE 112, WLAN 116, and UE 146. DPI 156 further includes packet stream or packet flow 402, ID rules device 404, binding update device 406, routing rules device 408, and gating circuits 422-426. It should be noted that the underlying concept of the exemplary embodiment(s) of the present invention would not change if one or more blocks (or devices) were added to or removed from diagram 400.

ID rules device or module 404, in one embodiment, contains operator defined and/or published routing policies, flow identifications, applications, and so forth, which can also be called ISRP (Inter System Routing Policies) which can be downloaded and installed in UE 146. For instance, ISRP tells UE 146 regarding whether a particular flow should be offloaded to WLAN 116 or continue to travel through LTE network 112. Devices 404-408, in one example, can be combined into one or two units. Alternatively, devices 404-408 may reside in PDN-GW instead of DPI 156.

During an operation, upon arrival of packet flow 402, it is compared with ID rules at comparator 420. If comparator 420 determines that packet flow 402 is an off-loadable packet flow, it activates gate circuit 422 to forward a copy of packet flow 402 to S-GW 110. At the same time, binding updates 406 generates a set of binding updates 406 based on ID rules from device 404 and routing rules from device 408. After generation of binding updates and routing rules, packet flow 402 together with binding updates and routing rules are sent to UE 146 via LTE network 112 and connection 416. After storing and installing the binding updates and routing rules/policies, UE 146 sends a binding acknowledgement back to DPI 156 via LTE network 112, and begins to receive and send subsequent packet flows associated with packet flow 402 via connection 412 to WLAN 116.

An advantage of using DWO is that it relieves LTE traffic congestion by offloading a portion of traffic to WLAN whereby overall network performance is improved.

The exemplary aspect of the present invention includes various processing steps, which will be described below. The steps of the aspect may be embodied in machine, router, or computer executable instructions. The instructions can be used to create a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 5:
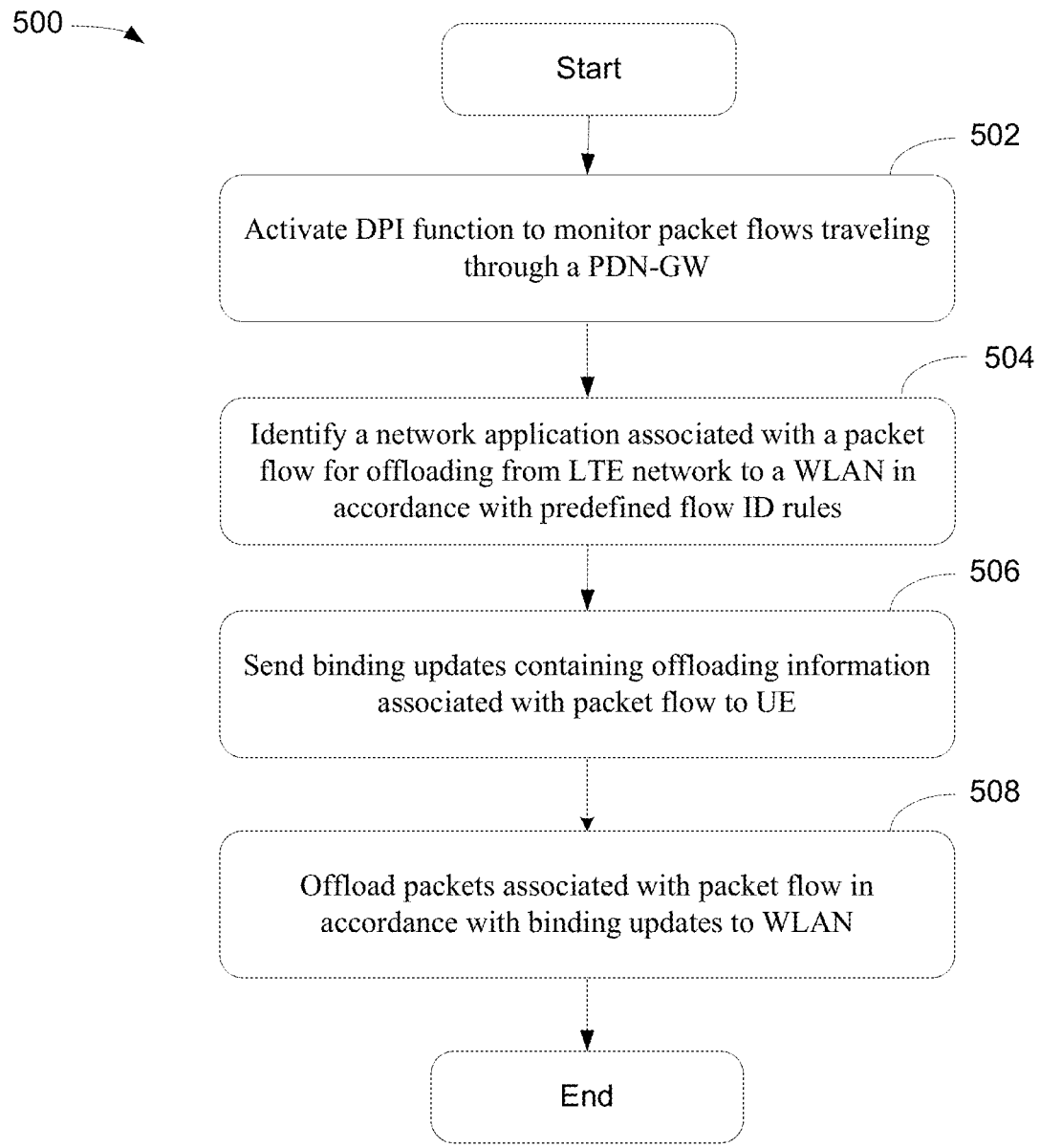
FIG. 5 is a flowchart illustrating an exemplary process of identifying a packet flow using DPI function for offloading in accordance with one embodiment of the present invention.

FIG. 5 is a flowchart 500 illustrating an exemplary process that identifies packet flow using DPI function for traffic offloading in accordance with one embodiment of the present invention. At block 502, a process for offloading network traffic to a wireless communication network is able to activate DPI function to monitor packet flows traveling through a PDN-GW. For example, every packet flow traveling from Internet to an S-GW via the PDN-GW is monitored and inspected. In one embodiment, a set of predefined flow ID rules as well as routing policy are forwarded from a server of PCRF (policy and charging rules function) to PDN-GW thereby DPI can inspect packet flow based on the policies.

At block 504, the process identifies a network application associated with a packet flow for offloading the packet flow from LTE network to WLAN in accordance with predefined flow ID rules. For example, the packet flow for offloading is identified based on source IP address, destination IP address, source port number, destination port number, and IP protocol type. Alternatively, the packet flow for offloading can also be identified based on URL, application, and traffic type.

At block 506, binding updates that contain offloading information associated with the packet flow is sent from PDN-GW to a UE. It should be noted that the binding updates may be generated by the PDN-GW or DPI function.

At block 508, various packets associated with the packet flow for offloading according to binding updates are offloaded from the LTE network to the WLAN. For example, the process is able to offload or send a voice-audio packet flow from the PDN-GW to the UE via the LTE network. In an alternative example, the binding updates containing offloading information are forwarded via the ePDG. It should be noted that in light of the predefined flow ID rules, the process is able to identify and characterize every packet flow for possibility of offloading to WLAN to alleviate traffic load on LTE network. The binding updates containing offloading information associated with each packet flow or application may be forwarded from PDN-GW to the identified UE.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for routing network traffic in a communication network comprising:
    activating deep packet inspection ("DPI") in a packet data network gateway ("PDN-GW") to monitor packet flows traveling through the PDN-GW to detect off-loadable network application within the packet flows;
    identifying by DPI a first off-loadable network application associated with a first packet flow capable of being off-loaded from a long term evolution ("LTE") network to a wireless local area network ("WLAN") in accordance with a plurality of predefined flow identification ("ID") rules; and
    sending a plurality of binding updates containing offloading information associated with the first packet flow from the PDN-GW to a first user equipment ("UE") for offloading at least a portion of the first packet flow from the LTE network to the WLAN.

2. The method of claim 1, further comprising offloading a plurality of packets associated with the first packet flow in accordance with the plurality of binding updates from the LTE network to the WLAN.

3. The method of claim 2, further comprising receiving the plurality of predefined flow ID rules from a server of policy and charging rules function ("PCRF") to the PDN-GW.

4. The method of claim 3, further comprising sending a voice-audio packet flow from the PDN-GW to the first UE via the LTE network.

5. The method of claim 1, wherein activating deep packet inspection ("DPI") to monitor packet flows traveling through a packet data network gateway ("PDN-GW") includes monitoring packet flows traveling from Internet to serving gateway ("S-GW") via the PDN-GW.

6. The method of claim 1, wherein identifying a first off-loadable network application associated with a first packet flow capable of being offloaded includes identifying the first packet flow in response to source Internet Protocol ("IP") address, destination IP address, source port number, destination port number, and IP protocol type.

7. The method of claim 1, wherein identifying a first off-loadable network application associated with a first packet flow capable of being offloaded includes identifying the first packet flow in response to one of uniform resource locator ("URL"), application, and traffic type.

8. The method of claim 1, wherein sending a plurality of binding updates containing offloading information associated with the first packet flow includes forwarding binding updates to evolved packet data gateway ("ePDG").

9. The method of claim 1, further comprising:
    identifying a second off-loadable network application associated with a second packet flow for offloading the second packet flow from the LTE network to the WLAN in accordance with the plurality of predefined flow ID rules; and
    sending binding updates containing offloading information associated with the second packet flow from the PDN-GW to a second UE.

10. A method for network routing comprising:
    activating deep packet inspection ("DPI") module in a packet data network gateway ("PDN-GW") to monitor packet flows traveling through the PDN-GW to detect off-loadable network application within the packet flows;
    identifying by DPI module an off-loadable packet flow for offloading from a long term evolution ("LTE") network to a wireless local area network ("WLAN") in accordance with a plurality of predefined flow identification ("ID") rules;
    sending binding updates containing 5-tuple associated with the off-loadable packet flow for offloading from the PDN-GW to a user equipment ("UE") which is destination of the off-loadable packet flow; and
    offloading at least a portion of packets from the off-loadable packet flow to the WLAN to reach the UE in response to the binding updates.

11. The method of claim 10, further comprising releasing LTE resource relating to the off-loadable packet flow.

12. The method of claim 11, further comprising installing a plurality of routing rules from the PDN-GW in the UE and switching routing of the off-loadable packet flow via the WLAN.

13. The method of claim 12, further comprising receiving the plurality of predefined flow ID rules from a server of policy and charging rules function ("PCRF") to the PDN-GW.

14. The method of claim 13, further comprising sending a voice-audio packet flow from the PDN-GW to the first UE via the LTE network.

15. A network layout configured to manage traffic loading, comprising:
    an evolved packet data gateway ("ePDG") coupled to a plurality of user equipments ("UEs") for providing network service between the plurality of UEs and a wireless local area network ("WLAN");
    a serving gateway ("S-GW") coupled to the plurality of UEs for providing network service between the plurality of UEs and long term evolution ("LTE") network; and
    a packet data network gateway ("PDN-GW") having a deep packet inspection ("DPI") agent, and coupled to the S-GW and the ePDG, wherein the DPI agent identifies off-loadable packet flows within packet flows traveling through the PDN-GW, wherein the PDN-GW is capable of offloading a portion of the off-loadable packet flows from the LTE network to the WLAN based on a plurality of predefined offload rules, wherein at least one of the plurality of UEs is configured to send a packet flow based on binding updates received from the PDN-GW.

16. The network layout of claim 15, wherein the ePDG employs Internet Protocol Security ("IPSec") to communicate with at least one of the plurality of UEs via an untrusted non-$3^{rd}$ Generation Partnership Project ("3GPP").

17. The network layout of claim 16, further comprising a cell site coupled to the S-GW and capable of communicating with at least one of the plurality of UEs via the LTE network.

18. The network layout of claim 15, wherein the DPI agent exams every packet flow passing through the PDN-GW, and generates binding updates based on packet flow's IP header 5-tuple, URL address, application, and traffic type.

19. The network layout of claim 15, further comprising a smart phone coupled to the ePDG and the WLAN and configured to release at least a portion of bandwidth of LTE after a portion of data stream is offloaded to the WLAN.

* * * * *